(12) United States Patent
Worden

(10) Patent No.: US 12,240,183 B2
(45) Date of Patent: Mar. 4, 2025

(54) HEAT PLATE LOCK ASSEMBLY FOR A HEAT SEALING MACHINE

(71) Applicant: Sonoco Development, Inc., Hartsville, SC (US)

(72) Inventor: Ronald F. Worden, Maple Park, IL (US)

(73) Assignee: Sonoco Development, Inc., Hartsville, SC (US)

(*) Notice: Subject to any disclaimer, the term of this patent is extended or adjusted under 35 U.S.C. 154(b) by 572 days.

(21) Appl. No.: 17/590,416

(22) Filed: Feb. 1, 2022

(65) Prior Publication Data

US 2022/0152938 A1    May 19, 2022

Related U.S. Application Data

(62) Division of application No. 16/786,002, filed on Feb. 10, 2020, now Pat. No. 11,267,203.

(51) Int. Cl.
*B29C 65/18* (2006.01)
*B29C 65/00* (2006.01)

(52) U.S. Cl.
CPC .............. *B29C 65/18* (2013.01); *B29C 66/81* (2013.01); *B29C 66/849* (2013.01)

(58) Field of Classification Search
CPC ........ B29C 65/18; B29C 66/81; B29C 66/849
USPC ...................................... 156/583.1
See application file for complete search history.

(56) References Cited

U.S. PATENT DOCUMENTS

| | | | |
|---|---|---|---|
| 3,488,807 A | | 1/1970 | Vossen |
| 3,923,590 A | * | 12/1975 | Humphries ............... B30B 1/04 |
| | | | 156/583.9 |
| 6,571,534 B2 | * | 6/2003 | De Young ............... B65B 7/162 |
| | | | 53/329.2 |
| 6,802,704 B2 | | 10/2004 | Steil et al. |
| 7,056,405 B2 | | 6/2006 | Worden |
| 7,585,168 B2 | | 9/2009 | Kato et al. |
| 8,128,394 B2 | | 3/2012 | Desmith et al. |
| 8,758,002 B2 | | 6/2014 | Di Somone |
| 2009/0050783 A1 | | 2/2009 | Roberts |

* cited by examiner

*Primary Examiner* — James D Sells
(74) *Attorney, Agent, or Firm* — von Briesen & Roper, s.c.

(57) ABSTRACT

A heat sealing machine may include a heater assembly, a heat plate lock assembly supporting a heat plate in proximity to the heater assembly, and a lock mechanism allowing the heat plate lock assembly to alternately open and close. The heat plate may be replaced by a second heat plate by moving the lock mechanism to a retracted position, moving a heat plate lock assembly to move the first heat plate away from the heater assembly, removing the first heat plate from the heat plate lock assembly, inserting the second heat plate into the heat plate lock assembly, moving the heat plate lock assembly to move the second heat plate into engagement with the heater assembly, and moving the lock mechanism to a locked position to maintain the engagement between the second heat plate and the heater assembly.

20 Claims, 4 Drawing Sheets

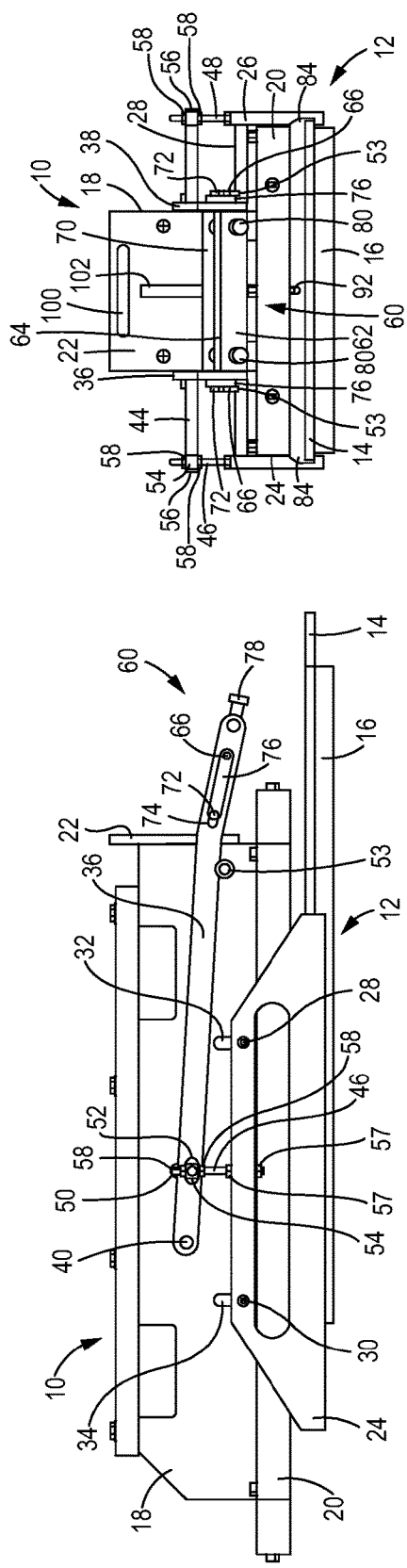

HEAT PLATE LOCK ASSEMBLY FOR A HEAT SEALING MACHINE

CROSS-REFERENCE TO RELATED APPLICATION

This application is a divisional of U.S. patent application Ser. No. 16/786,002, filed Feb. 10, 2020, which is incorporated by reference herein in its entirety.

TECHNICAL FIELD

The present disclosure relates generally to heat sealing and, more particularly, to a heat plate lock assembly for installing and uninstalling a heat plate on a heater assembly of a heat sealing machine for blister packaging.

BACKGROUND

Blister packages are pre-formed plastic packaging used for retention and display of small consumer goods, foods, pharmaceutical or similar products that are offered to consumers. A primary component of a blister pack is a cavity or pocket made from a formable web, usually a thermoformed plastic such as PVC, that is typically transparent. The cavity or pocket usually has a backing of paperboard, aluminum foil, plastic or the like that is adhered to the cavity or pocket by a heat activated adhesive to enclose and retain the product within the blister pack. With this arrangement, a consumer can visually examine the product through the transparent plastic.

Many heat sealing machines for blister packaging use heat and pressure via a die to activate the adhesive and affix the backing card to the cavity or pocket. In one presently known heat sealing machine, a conveyor device may have recesses for receiving the outer face of the cavity or pocket so that the open side is facing upward. After the cavity or pocket is placed in the recess, a backing card may be aligned in place on top of the cavity or pocket. One or both components may be pattern coated with an adhesive in the areas where the components will be sealed together. With both package components in place, the conveyor device may move the components under a heater assembly, or the heater assembly may be moved over the components, and a heated die of the heater assembly is moved into contact with the backing card to activate the adhesive and seal the blister package. The die may have raised surfaces shaped to correspond to the adhesive pattern so that heat and pressure are only applied to the package components in the areas that will be adhered.

The dies are typically not permanently mounted on the heater assembly so that they may be removed for maintenance, replacement or substitution of different dies configured for heat sealing blister packages having varying configurations. In current heater assemblies, dies are installed and removed via substantially manual operations. In one design of the heater assembly, a die is mounted on a heat plate that has posts extending upward from a top surface of the heat plate. Corresponding holes are provided in a heater platen and heater housing of the heater assembly. Installers move the die and heat plate under the platen and blindly align the posts with the holes. Once aligned, the die and heat plate are lifted until upper ends of the posts extend upward through holes in the top of the heater housing. The posts have annular grooves or slots proximate the upper ends that must be raised above the top surface of the heater housing. Once the die and heat plate are raised high enough, the installer uses one hand to throw a lever for a lock mechanism that slides into position and catches the slots of the posts to lock the die and heat plate in place at the bottom of the heater assembly. To remove or replace the die and heat plate, the lock mechanism is released, but at least one installer must be set to support the die and heat plate when the lever is thrown and the posts are released so the die and heat plate do not drop from the heater assembly and create a crushing hazard.

SUMMARY OF THE DISCLOSURE

In one aspect of the present disclosure, a method for installing a heat plate having a die mounted thereto in a heater assembly of a heat sealing machine is disclosed. The method for installing may include moving a heat plate lock assembly to an open position relative to the heater assembly, inserting the heat plate between a pair of clamp plates of the heat plate lock assembly that are movably mounted on opposite sides of the heater assembly, wherein the pair of clamp plates engages the heat plate to support the heat plate beneath a heater platen of the heater assembly, raising the pair of clamp plates to a closed position to bring the heat plate into contact with the heater platen, and releasing a lock mechanism to an extended position wherein the lock mechanism engages the heater assembly to retain the pair of clamp plates in the closed position.

In another aspect of the present disclosure, a method for replacing a first heat plate having a first die mounted thereto with a second heat plate having a second die mounted thereto in a heater assembly of a heat sealing machine is disclosed. The method for replacing may include moving a lock mechanism to a retracted position, moving a heat plate lock assembly to move the first heat plate away from a heater platen of the heater assembly, removing the first heat plate from the heat plate lock assembly, inserting the second heat plate into the heat plate lock assembly, moving the heat plate lock assembly to move the second heat plate into engagement with the heater platen, and moving the lock mechanism to a locked position to maintain the engagement between the second heat plate and the heater platen.

In a further aspect of the present disclosure, a method for removing a heat plate having a die mounted thereto from a heater assembly of a heat sealing machine is disclosed. The method for removing may include disengaging a lock mechanism from a heater housing of the heater assembly when a heat plate lock assembly of the heater assembly is in a closed position with the heat plate engaging a heater platen of the heater assembly, moving the heat plate lock assembly from the closed position to an open position where the heat plate is disengaged from the heater platen, and removing the heat plate from between a pair of clamp plates of the heat plate lock assembly that are movably mounted on opposite sides of the heater housing.

Additional aspects are defined by the claims of this patent.

BRIEF DESCRIPTION OF THE DRAWINGS

FIG. 1A is a side view of a heater assembly with a heat plate lock assembly in accordance with the present disclosure in an open position;

FIG. 1B is a front view of the heater assembly of FIG. 1A;

FIG. 1C is a top view of the heater assembly of FIG. 1A;

DETAILED DESCRIPTION

Figure 2B:
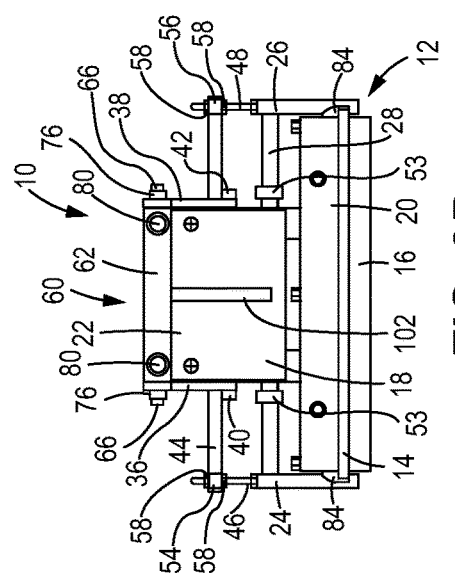
FIG. 2B is a front view of the heater assembly of FIG. 2A.

An improved heat plate lock assembly for a mounting a heat plate and die to a heater assembly of a heat sealing machine includes clamp plates mounted on either side of the heater assembly that are configured to receive and support the heat plate and the die that will apply heat and pressure to blister package components during operation to activate a pressure and heat sensitive adhesive. A heat plate lock assembly may be mounted on the heater assembly and coupled to the clamp plates. The heat plate lock assembly may be operable to move between an open position where the clamp plates are lowered to allow the heat plate and die to slide in and out under the heater assembly, and a locked position where the clamp plates are raised to bring the heat plate into contact with a heater platen of the heater assembly for heat transfer to the die. A lock mechanism may be engageable to hold the heat plate lock assembly in the locked position during operation of the heat sealing machine to seal blister packs.

In the following discussion, details of the structure and arrangement of the elements of the heat sealing machine other than the heater assembly are omitted in order to focus on the embodiments of the heat plate lock assembly in accordance with the present disclosure. Those skilled in the art will understand the other components and operational aspects of heat sealing machines known in the art, and will be enabled by the disclosure herein to integrate heat plate lock assembly in accordance with the present disclosure into heat sealing machines and seal blister packaging.

FIGS. 1A-1C illustrate an example of a heater assembly 10 of a heat sealing machine (other components not shown) including an embodiment of a heat plate lock assembly 12 in accordance with the present disclosure for a heat plate 14 and a die 16. The heat plate 14 and the die 16 may be separate components connected to each other as shown or may be portions of a single unitary component. The heater assembly 10 includes a heater housing 18 and a heater platen 20 mounted at a bottom surface of the heater housing 18. The heater housing 18 and the heater platen 20 include heating elements (not shown) that are known in the art to generate heat that is transferred to the heater platen 20. The heater housing 18 may also include a lock plate 22 that may interact with the heat plate lock assembly 12 as discussed further below to retain the heat plate lock assembly 12 in a closed and locked position.

Figure 2A:
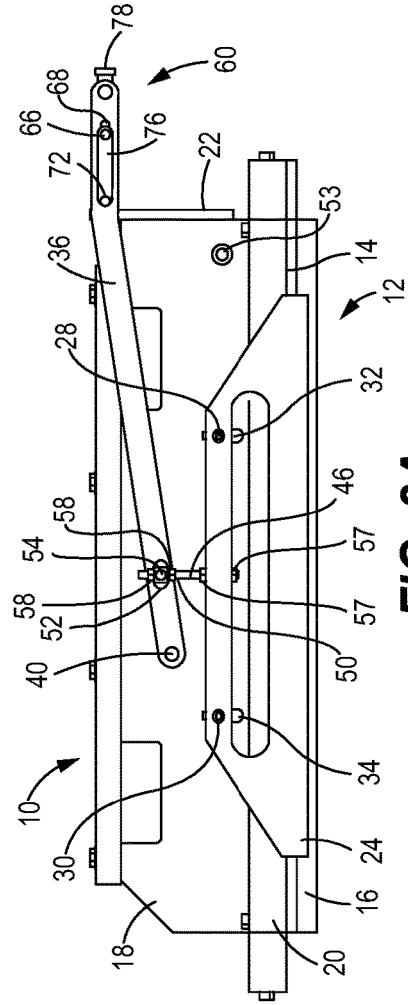
FIG. 2A is a side view of the heater assembly of FIG. 1A with the heat plate lock assembly in a closed position.

The heat plate lock assembly 12 includes a pair of clamp plates 24, 26 mounted on opposite sides of the heater housing 18 and the heater platen 20. The clamp plates 24, 26 may be connected to each other via clamp plate support rods 28, 30 extending through corresponding support rod guide slots 32, 34 (FIG. 1A) in the walls of the heater housing 18. The support rod guide slots 32, 34 may be elongated in a vertical direction to allow the support rods 28, 30 to move up and down relative to the heater housing 18 between the open position of FIGS. 1A-1C and a closed and locked position of FIGS. 2A-2C.

The vertical position of the clamp plates 24, 26 relative to the heater housing 18 is controlled by a pair of lift arms 36, 38 that are pivotally connected to the heater housing 18 by lift arm shaft screws 40, 42. The lift arms 36, 38 extend beyond an end of the heater housing 18 at which the lock plate 22 is mounted. The lift arms 36, 38 are operatively connected to the clamp plates 24, 26 by a kinematic mechanism that can convert movement of the lift arms 36, 38 into movement of the clamp plates 24, 26. In the illustrated embodiment, rotation of the lift arms 36, 38 is converted into vertical movement of the clamp plates 24, 26 by a lift rod 44 and height adjustment rods 46, 48. The lift rod 44 extends through lift rod guide slots 50 in the walls of the heater housing 18 that are elongated in a similar manner as the support rod guide slots 32, 34 to allow the lift rod 44 to travel vertically. The lift rod 44 also extends through elongated lift arm slots 52 of the lift arms 36, 38. A radial distance between the lift rod 44 and the lift arm shaft screws 40, 42 will change as the lift arms 36, 38 rotate and the lift rod 44 moves vertically, and the lift arm slots 52 are configured to allow the relative movement and radial distance change to occur without interference or binding between the lift arms 36, 38 and the lift rod 44.

The heat plate lock assembly 12 is configured to allow the lift arms 36, 38 to move through the range of motion required to travel between the open position and the closed position. Downward travel to the open position may be limited by stop bolts 53 mounted on either side of the heater housing 18 proximate the heater platen 20 and the end at which the lock plate 22 is mounted. The lift arms 36, 38 will rest on the stop bolts 53 at the open position while the operator removes one heat plate 14 and inserts another. Upward travel of the lift arms 36, 38 will be limited by the heat plate 14 coming into contact with the bottom surface of the heater platen 20 at the closed position.

The height adjustment rods 46, 48 are coupled to the lift rod 44 above their corresponding clamp plates 24, 26. Height adjustment brackets 54, 56 may be mounted to the opposite ends of the lift rod 44 and be configured to engage the height adjustment rods 46, 48 in a manner that allows adjustment of the position of the height adjustment rods 46, 48 relative to the lift rod 44. Lower ends of the height adjustment rods 46, 48 may extend through corresponding bores in the clamp plates 24, 26 and be held in place relative to the clamp plates 24, 26 by support nuts 57. In the illustrated embodiment, the height adjustment rods 46, 48 have external threads, and upper and lower height adjustment nuts 58 are screwed onto the height adjustment rods 46, 48 above and below the respective height adjustment brackets 54, 56. Rotation of the upper height adjustment nuts 58 about the height adjustment rods 46, 48 in one direction will raise the clamp plates 24, 26 relative to the lift rod 44, while rotation in the opposite direction will lower the clamp plates 24, 26. In this manner, the heat plate lock assembly 12 can accommodate slight variations in the thicknesses of the heat plates 14 due to manufacturing tolerances to ensure contact between the heat plate 14 and the heater platen 20 for heat transfer to the die 16, and to ensure that the heat plate lock assembly 12 can be raised to the closed position and locked in place. In an alternative embodiment, the bores of the height adjustment brackets 54, 56 may have internal threads that mesh with the threads of the height adjustment rods 46, 48 so that the height adjustment rods 46, 48 may be rotated in either direction to raise and lower the clamp plates 24, 26. Those skilled in the art will understand that the height adjustment mechanisms illustrated and described herein are exemplary. Alternative mechanical, electro-mechanical, hydraulic, pneumatic or other type mechanisms may be implemented to adjust the height of the clamp plates 24, 26 relative to the lift rod 44 and/or a point of connection with the lift arms 36, 38, and are contemplated by the inventors as having use in heat plate lock assemblies 12 in accordance with the present disclosure.

The illustrated heat plate lock assembly 12 further includes a lock mechanism 60 that is selectively dis-engageable and engageable to allow the heat plate lock assembly 12 to move between and be retained in the open and closed positions. In the illustrated embodiment, the lock mechanism 60 is positioned on the lift arms 36, 38 opposite the lift arm shaft screws 40, 42 and proximate a lift handle 62 that is affixed to the ends of the lift arms 36, 38. The lift handle 62 is grasped by an operator of the heat sealing machine to move the heat plate lock assembly 21 between the open position of FIGS. 1A-1C and the closed position of FIGS. 2A-2C. Proximate the lift handle 62, a release handle 64 is slidably mounted to the lift arms 36, 38. Release handle mounting screws 66 extend through elongated release handle slots 68 (FIG. 2A) to retain the release handle 64 between the lift arms 36, 38 while allowing the release handle 64 to move toward and away from the lift handle 62. A lock bar 70 is mounted to the lift arms 36, 38 in a similar manner opposite the release handle 64 from the lift handle 62 and proximate the heater housing 18 and the lock plate 22. Lock bar mounting screws 72 extend through elongated lock bar slots 74 (FIG. 1A) to retain the lock bar 70 between the lift arms 36, 38 while allowing the lock bar 70 to move toward and away from the lift handle 62. The release handle 64 and the lock bar 70 are secured to move together within the constraints of the slots 68, 74 by unitizing plates 76 positioned on the exterior surfaces of the lift arms 36, 38 and connected between the corresponding mounting screws 66, 72. The lock bar 70 further include a lock plate engaging finger 78 extending outward toward the heater housing 18 and engaging the lock plate 22 is a manner described more fully below.

Figure 2C:
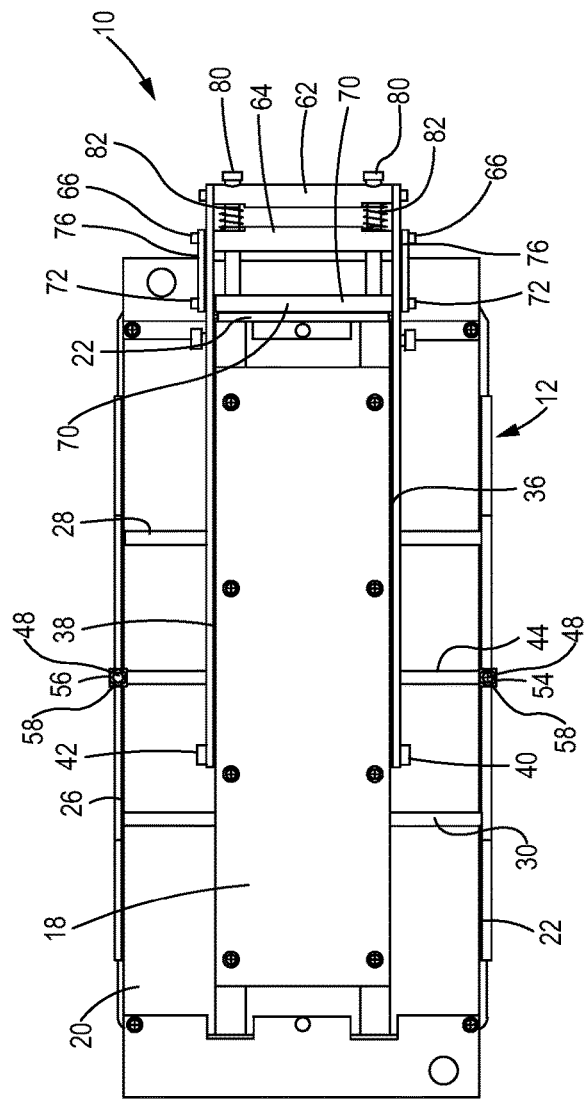
FIG. 2C is a top view of the heater assembly of FIG. 2A.

The lock mechanism 60 further includes lock pins 80 that function with the unitizing plates 76 to control the movement of the release handle 64 and the lock bar 70. The lock pins 80 are elongated and extend through corresponding bores through the lift handle 62 and the release handle 64 and terminate at threaded lock tips (not shown) that may have a smaller outer diameter than a main portion of the lock pins 80 and may be screwed into internally threaded bores of the lock bar 70. With the release handle 64 and the lock bar 70 connected by the unitizing plates 76, and the lock pins 80 engaged by the lock bar 70, the release handle 64, the lock bar 70 and the lock pins 80 move back and forth as a unit relative to the lift arms 36, 38 and the lift handle 62. Lock springs 82 are disposed around the lock pins 80 and between the lift handle 62 and the release handle 64, and bias the release handle 64, the lock bar 70 and the lock pins 80 toward an extended or locking position as shown in FIG. 2C.

Figure 3:
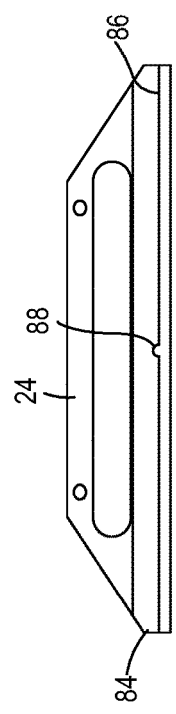
FIG. 3 is a side view of a clamp plate of the heat plate lift and lock assembly.
Figure 4:
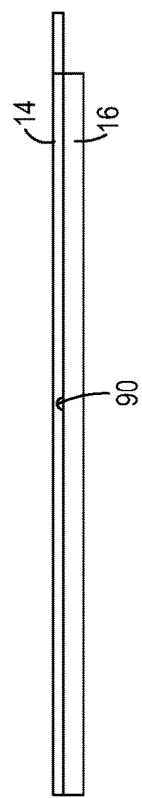
FIG. 4 is a side view of a die and heat plate in accordance with the present disclosure of the heater assembly of FIG. 1A.

The clamp plates 24, 26 are configured to receive and support the heat plate 14 and the die 16. As shown in the end view of FIG. 1B, the heat plate 14 may be wider than the die 16 to form overhanging flanges at the lateral edges. The clamp plates 24, 26 each have a recessed retention channel 84 (FIGS. 1B, 2B, 3) extending along its length and forming a plate support surface 86 that is complimentary to the flanges of the heat plate 14. To ensure that the heat plate 14 and the die 16 are accurately positioned under the heater platen 20, the clamp plates 24, 26 may be configures with an alignment or indexing mechanism that engages the heat plate 14 and indicates proper alignment in at least the longitudinal direction. In the illustrated embodiment, the clamp plates 24, 26 have one or more indexing fingers 88 extending upward from the plate support surfaces 86. Each lateral edge of the heat plate 14 may include one or more indexing recesses 90 extending upward into the heat plate 14 that are complimentary to corresponding indexing fingers 88 of the plate support surface 86. The heat plate 14 will be in correct longitudinal alignment when the indexing recesses 90 receive the corresponding indexing fingers 88. In alternative embodiments, the indexing fingers 88 may extend downward from the lateral edges of the heat plate 14 and the indexing recesses 90 may be formed in the plate support surfaces 86.

Figure 5:
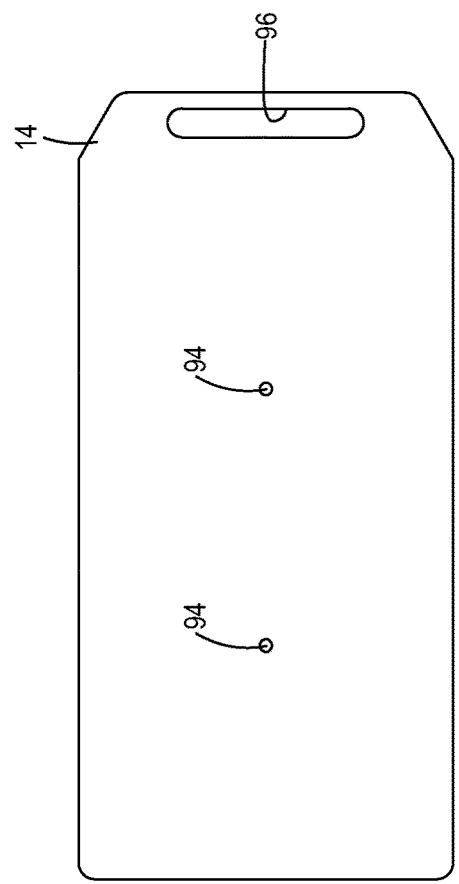
FIG. 5 is a top view of the die and heat plate of FIG. 4.

An alternative or additional alignment mechanism may be included for lateral alignment of the heat plate 14 and the die 16. One or more alignment pins 92 (FIG. 1B) may extend downward from a bottom surface of the heater platen 20. The alignment pins 92 may have tapered ends and may be spring biased downward to allow upward deflection when engaged by the heat plate 14. The heat plate 14 may have corresponding alignment holes 94 (FIG. 5) in the upper surface that are sized and positioned to receive the alignment pins 92 when the heat plate 14 is in the appropriate longitudinal and lateral position under the heater platen 20. The heat plate 14 may include a handle slot 96 (FIGS. 1C and 5) that may be grasped by the operator to slide the heat plate 14 into and out of the retention channels 84 of the clamp plates 24, 26, and to align the indexing recesses 90 and the alignment holes 94 with the indexing fingers 88 and the alignment pins 92, respectively.

INDUSTRIAL APPLICABILITY

The heat plate lock assembly 12 in accordance with the present disclosure and as illustrated and described herein allows a single operator of a heat sealing machine to install and remove a heat plate 14 and a die 16 on a heater assembly 10 of the heat sealing machine. With the heat plate lock assembly 12 in the open position as shown in FIGS. 1A-1C and 6A, the heat plate 14 and the die 16 may be inserted between the clamp plates 24, 26 with the lateral edges of the heat plate 14 disposed within the retention channels 84. The operator slides the heat plate 14 under the heater platen 20 until the indexing recesses 90 receive the corresponding indexing fingers 88 and longitudinally position the heat plate 14 and the die 16. In some embodiments, the alignment pins 92 may extend downward far enough to be engaged by the heat plate 14 during insertion. In such embodiments, the alignment pins 92 deflect upward, and the operator adjusts the position of the heat plate 14 until the alignment pins 92 drop into the alignment holes 94 to thereby indicate that the heat plate 14 is accurately positioned beneath the heater platen 20.

The lock plate 22 is shown in cross-section in FIGS. 6A-6D. The lock plate 22 is configured to interact with the lock plate engaging finger 78 of the lock mechanism 60 to alternately lock and release the heat plate lock assembly 12 in the closed position. The lock plate 22 as illustrated includes a lock slot 100 defined therein proximate an upper end and sized to receive the lock plate engaging finger 78 of the lock bar 70. The lock plate 22 further includes a finger guide slot 102 recessed therein. The finger guide slot 102 is deepest into the lock plate 22 proximate a lower end of the lock plate 22 and shallows as it extends upward toward the lock slot 100. With this configuration, the finger guide slot 102 engages the lock plate engaging finger 78 to cause the lock mechanism 60 to displace against the biasing force of the lock springs 82 from an extended position toward a retracted position as illustrated in the sequence from FIG. 6A to FIG. 6C.

Figure 6B:
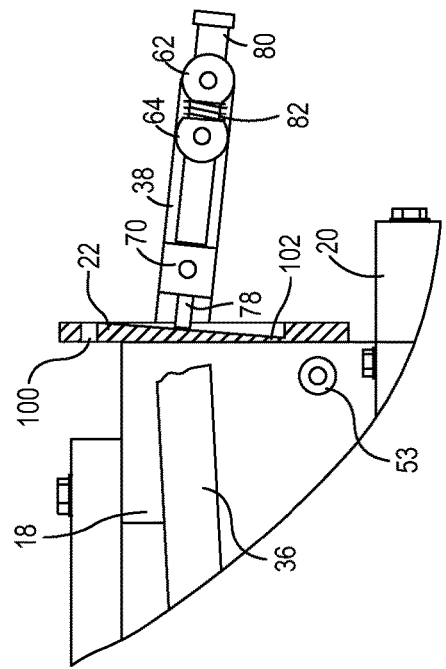
FIG. 6B is the enlarged view of the portion of the heater assembly of FIG. 1A with the heat plate lock assembly in an intermediate position and the lock mechanism in a retracted position.
Figure 6D:
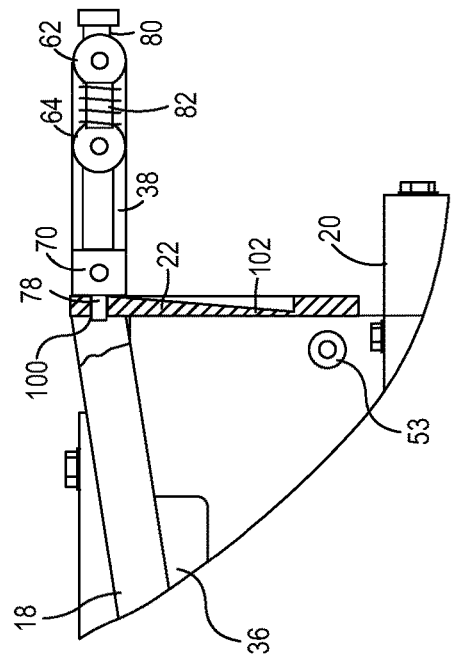
FIG. 6D is the enlarged view of the portion of the heater assembly of FIG. 1A with the heat plate lock assembly in the closed position and the lock mechanism in the extended position.
Figure 6A:
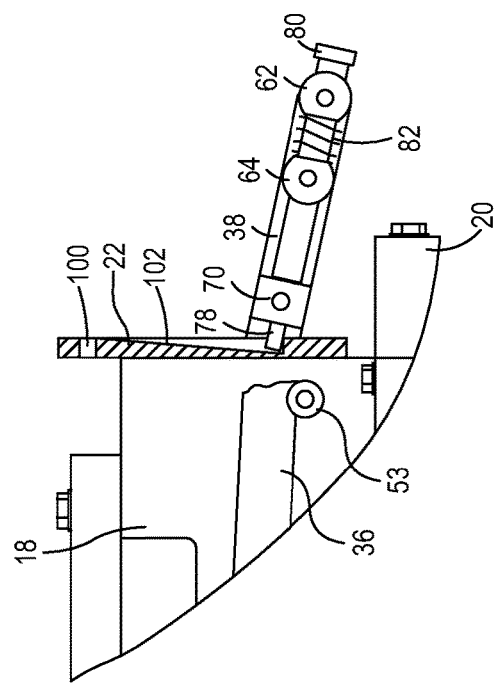
FIG. 6A is an enlarged view of a portion of the heater assembly of FIG. 1A with a lift arm partially removed to reveal components of a lock mechanism, and with the heat plate lock assembly in the open position and the lock mechanism in an extended position.
Figure 6C:
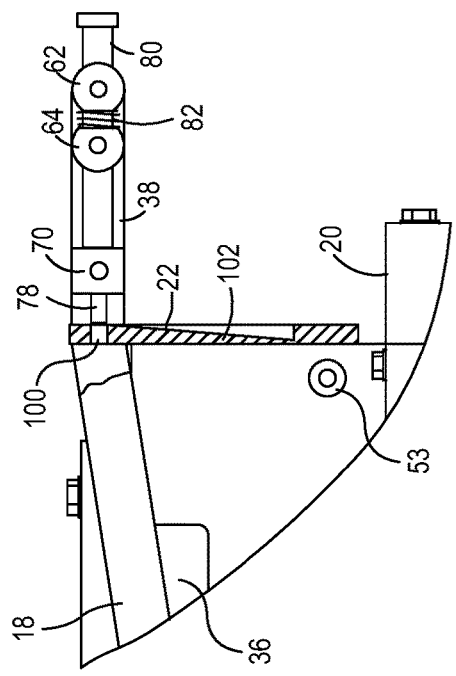
FIG. 6C is the enlarged view of the portion of the heater assembly of FIG. 1A with the heat plate lock assembly in the closed position and the lock mechanism in the retracted position.

Once the heat plate 14 and the die 16 are inserted and aligned, the operator can raise the heat plate lock assembly 12. The operator may grasp the lift handle 62 and the release handle 64 simultaneously and pull the release handle 64 toward the lift handle 62 and against the biasing force of the lock springs 82 to the retracted position. Alternatively, the operator may grasp the lift handle 62 without pulling the release handle 64 and instead allow the ramp of the finger guide slot 102 to displace the lock mechanism as shown in FIG. 6B as the lift arms 36, 38 are raised. The retraction of the lock plate engaging finger 78 of the lock mechanism 60 allows the lift arms 36, 38 to be raised to the closed position of FIGS. 2A-2C and 6C and align the lock plate engaging finger 78 with the lock slot of the lock plate 22. At this position, the heat plate 14 is raised into surface-to-surface contact with the heater platen 20. With the lift arms 36, 38 in the closed position, the release handle 64 is released, or the lock plate engaging finger 78 is disengaged from the surface of the lock plate 22, to allow the lock springs 82 to force the lock mechanism 60 to the extended position as shown in FIG. 6D. The lock plate engaging finger 78 extends into the lock slot 100 and rests in the lock slot 100 to hold the heat plate lock assembly 12 in the closed position while the heat sealing machine operates to seal blister packages. In alternative embodiments, the lock plate 22 may extend upward only to the bottom edge of the lock slot 100 and have the lock plate engaging finger 78 rest thereon when the heat plate lock assembly 12 is in the closed position. When it is time to remove the heat plate 14 and the die 16 from the heater assembly 10, the operator grasps the lift handle 62 and the release handle 64 to move the lock mechanism 60 to the retracted position of FIG. 6C and lowers the lift arms 36, 38 to the open position.

As mentioned previously, the heat plate lock assembly 12 as illustrated and described herein is exemplary, and alternative configurations for heat plate lock assemblies in accordance with the present disclosure are contemplated by the inventor. For example, the clamp plates 24, 26 may travel though paths other than the vertical linear path as shown, such as through circular or elliptical arcs or other types of non-linear paths. The lift arms 36, 38 may be configured to mover through non-circular paths, such as horizontal or vertical linear paths or non-circular rotational paths. Depending on the paths of travel of the clamp plates 24, 26 and the lift arms 36, 38, the components may be connected by appropriate kinematic elements to translate motion of the lift arm 36, 38 into the required motion of the clamp plates 24, 26. Alternate configurations of the height adjustment mechanism and the lock mechanism 60 are also contemplated, and the operation of the heat plate lock assembly 12 may be partially or fully automated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method for installing a heat plate having a die mounted thereto in a heater assembly of a heat sealing machine, comprising
    moving a heat plate lock assembly to an open position relative to the heater assembly;
    inserting the heat plate between a pair of clamp plates of the heat plate lock assembly that are movably mounted on opposite sides of the heater assembly, wherein the pair of clamp plates engages the heat plate to support the heat plate beneath a heater platen of the heater assembly;
    raising the pair of clamp plates to a closed position to bring the heat plate into contact with the heater platen; and
    releasing a lock mechanism to an extended position wherein the lock mechanism engages the heater assembly to retain the pair of clamp plates in the closed position.

2. The method for installing according to claim 1, comprising, before raising the pair of clamp plates, moving the lock mechanism to a retracted position where the lock mechanism does not engage the heater assembly.

3. The method for installing according to claim 1, comprising, before raising the pair of clamp plates, positioning the heat plate so that indexing fingers of the pair of clamp plates are received by indexing recesses defined in the heat plate to align the heat plate beneath the heater platen of the heater assembly.

4. The method for installing according to claim 1, comprising, before raising the pair of clamp plates, positioning the heat plate with an alignment hole in an upper surface of the heat plate receiving an alignment pin extending downward from a bottom surface of the heater platen of the heater assembly.

5. The method for installing according to claim 1, comprising, after operating the heat sealing machine:
    moving the lock mechanism to a retracted position wherein the lock mechanism is disengaged from the heater assembly to allow the pair of clamp plates to move from the closed position to the open position;

lowering the pair of clamp plates to the open position to move the heat plate away from the heater platen; and removing the heat plate from between the pair of clamp plates.

6. The method for installing according to claim 1, comprising, before inserting the heat plate, adjusting a position of the pair of clamp plates relative to the heater assembly to correspond to a heat plate thickness of the heat plate.

7. The method for installing according to claim 6, wherein the pair of clamp plates are operatively connected to the lock mechanism by a lift rod, and wherein adjusting the position of the pair of clamp plates comprises adjusting the position of the pair of clamp plates relative to the lift rod.

8. The method for installing according to claim 1, wherein each of the pair of clamp plates comprises a retention channel facing the opposite one of the pair of clamp plates, and wherein inserting the heat plate comprises inserting each lateral edge of the heat plate into the retention channel of a corresponding one of the pair of clamp plates.

9. The method for installing according to claim 1, wherein each of the pair of clamp plates comprises a plate support surface, and wherein inserting the heat plate comprises inserting the heat plate between the pair of clamp plates with each lateral edge of the heat plate disposed on the plate support surface of a corresponding one of the pair of clamp plates.

10. The method for installing according to claim 1, wherein the heat plate lock assembly includes a lock plate engaging finger that is disposed within a lock slot of the heater assembly when the pair of clamp plates are in the closed position and the lock mechanism is in the extended position, the method for installing comprising, while raising the pair of clamp plates, engaging the lock plate engaging finger by a surface of a finger guide slot of the heater assembly to move the lock plate engaging finger from the extended position to a retracted position.

11. A method for replacing a first heat plate having a first die mounted thereto with a second heat plate having a second die mounted thereto in a heater assembly of a heat sealing machine, comprising:
moving a lock mechanism to a retracted position;
moving a heat plate lock assembly to move the first heat plate away from a heater platen of the heater assembly;
removing the first heat plate from the heat plate lock assembly;
inserting the second heat plate into the heat plate lock assembly;
moving the heat plate lock assembly to move the second heat plate into engagement with the heater platen; and
moving the lock mechanism to a locked position to maintain the engagement between the second heat plate and the heater platen.

12. The method for replacing according to claim 11, wherein the lock mechanism includes a lift handle and a release handle that is spring biased away from the lift handle, and wherein moving the lock mechanism to the retracted position comprises pulling the release handle toward the lift handle.

13. The method for replacing according to claim 11, wherein the heat plate lock assembly comprises a lift arm pivotally connected to the heater assembly, and wherein moving the heat plate lock assembly to move the first heat plate away from the heater platen comprises rotating the lift arm to lower the first heat plate away from the heater platen.

14. The method for replacing according to claim 11, wherein the heat plate lock assembly includes a pair of clamp plates that are movably mounted on opposite sides of the heater assembly, wherein each of the pair of clamp plates comprises a plate support surface, and wherein inserting the second heat plate comprises inserting the second heat plate between the pair of clamp plates with each lateral edge of the second heat plate disposed on the plate support surface of a corresponding one of the pair of clamp plates.

15. The method for replacing according to claim 11, wherein the heat plate lock assembly includes a pair of clamp plates that are movably mounted on opposite sides of the heater assembly, and wherein the method for replacing comprises, before inserting the second heat plate, adjusting a position of the pair of clamp plates relative to the heater assembly to correspond to a heat plate thickness of the second heat plate.

16. The method for replacing according to claim 11, wherein the lock mechanism includes a lift handle operatively connected to the heat plate lock assembly, and wherein moving the heat plate lock assembly to move the second heat plate into the engagement with the heater platen comprises raising the lift handle to move the second heat plate upward into the engagement with the heater platen.

17. A method for removing a heat plate having a die mounted thereto from a heater assembly of a heat sealing machine, comprising
disengaging a lock mechanism from a heater housing of the heater assembly when a heat plate lock assembly of the heater assembly is in a closed position with the heat plate engaging a heater platen of the heater assembly;
moving the heat plate lock assembly from the closed position to an open position where the heat plate is disengaged from the heater platen; and
removing the heat plate from between a pair of clamp plates of the heat plate lock assembly that are movably mounted on opposite sides of the heater housing.

18. The method for removing according to claim 17, wherein the heater assembly includes a lock slot and the heat plate lock assembly includes a lock plate engaging finger that moves from a retracted position to an extended position and into the lock slot when the heat plate lock assembly is in the closed position, wherein disengaging the lock mechanism comprises moving the lock plate engaging finger to the retracted position and out of the lock slot when the heat plate lock assembly is in the closed position.

19. The method for removing according to claim 17, wherein the heat plate lock assembly comprises a lift arm pivotally connected to the heater assembly, and wherein moving the heat plate lock assembly to the open position comprises rotating the lift arm to lower the heat plate away from the heater platen.

20. The method for removing according to claim 17, wherein each of the pair of clamp plates comprises a retention channel having a corresponding lateral edge of the heat plate disposed therein, and wherein removing the heat plate comprises sliding the corresponding lateral edge of the heat plate out the retention channel of each of the pair of clamp plates.

\* \* \* \* \*